US007896992B2

(12) United States Patent
Harms

(10) Patent No.: US 7,896,992 B2

(45) Date of Patent: Mar. 1, 2011

(54) METHOD FOR COMPACTING A SURFACE OF A WOODEN WORKPIECE AND DEVICE THEREFOR

(76) Inventor: Dirk Harms, Gmunden (AT)

(*) Notice: Subject to any disclaimer, the term of this patent is extended or adjusted under 35 U.S.C. 154(b) by 484 days.

(21) Appl. No.: 10/597,662

(22) PCT Filed: Feb. 4, 2005

(86) PCT No.: PCT/AT2005/000034

§ 371 (c)(1), (2), (4) Date: Jul. 31, 2008

(87) PCT Pub. No.: WO2005/075165

PCT Pub. Date: Aug. 18, 2005

(65) Prior Publication Data

US 2008/0277022 A1 Nov. 13, 2008

(30) Foreign Application Priority Data

Feb. 4, 2004 (AT) ............................... A 161/2004

(51) Int. Cl.
*B32B 37/00* (2006.01)

(52) U.S. Cl. ......................... 156/64; 156/73.1; 156/311

(58) Field of Classification Search .................. 156/64, 156/73.1, 73.5, 73.6, 153, 311, 363, 498, 156/555, 580, 583.1, 583.5
See application file for complete search history.

(56) References Cited

U.S. PATENT DOCUMENTS 6,047,751 A 4/2000 An

FOREIGN PATENT DOCUMENTS

| | | | |
|---|---|---|---|
| DE | 601 162 C | | 8/1934 |
| DE | 636 413 C | | 10/1936 |
| DE | 853 402 C | | 10/1952 |
| GB | 708342 | * | 5/1954 |
| WO | WO 00/79137 | | 12/2000 |

* cited by examiner

*Primary Examiner*—James Sells
(74) *Attorney, Agent, or Firm*—Workman Nydegger

(57) ABSTRACT

A method for compacting a surface of a wooden workpiece (1), wherein the addition of a foreign material is to be avoided, is characterized in that the surface (17) of the wooden workpiece (1)—while preventing the entry of oxygen—is heated in at least partial areas by supplying energy to the surface (17) and under pressure until a thermoplastic adhesive substance (3) coming from the wooden workpiece (1) is formed, whereupon the surface (17) and a volume area beneath the surface (17) are compacted under application of pressure while being cooled.

38 Claims, 4 Drawing Sheets

METHOD FOR COMPACTING A SURFACE OF A WOODEN WORKPIECE AND DEVICE THEREFOR

The invention relates to a method for compacting a surface of a wooden workpiece as well as to a device for carrying out said method.

Within the scope of the description of said invention and the patent claims, the term "wooden workpiece" should not be limited only to solid workpieces manufactured from wood such as, for example, spruce, fir, oak. The method described in the following and the associated device are similarly applicable to all materials that are similar to wood in terms of material technology, such as, for example, bamboo, reed and other wood-based materials such as plywood, chipboard and/or wood-containing paper or paper enriched with resins, in so far as those components in the wood which are required for producing the thermoplastic adhesive substance are provided at least in the area subject to the method according to the invention.

Methods which include a compaction of porous materials facilitate an improvement of the mechanical properties of those porous materials. Such a compaction is generally characterized by an increase in specific density; with porous materials such as wood, this is effected, according to the current state of the art, first of all by compressing the cells and/or, secondly, by impregnating the cavities enclosed by the cell walls.

1. By compressing the wood cells, the cavity enclosed by the cell walls is made smaller. As described in "KOLLMANN Franz, COTÉ Wilfried A.: Principals of Wood Science and Technology, Springer-Verlag Berlin Heidelberg New York 1968" and "Parviz NAVI, Fred GIRARDET: Effects of Thermo-Hydro-Mechanical Treatment on the Structure and Properties of Wood, Holzforschung 54 (2000) p. 287-293 (Offprint) Verlag Walter de Gruyter Berlin New York", after a previous reduction in the modulus of elasticity, such a deformation of wood cells occurs in the direction of the smaller buckling length and lower stiffness of the wood cell wall, that is, in the principal axis on the cross-sectional plane of a tree trunk, i.e., vertically to the fibre direction. The wood structure is thereby not damaged (cf. DE 601 162 A; Verfahren und Vorrichtung zum Verdichten von Holz).
2. The density of a porous material can be increased by impregnating the workpiece, i.e., by filling the cell cavities in the wood with an appropriate substance. Depending on the desired impregnation depth and porosity of such an impregnation, a suitable impregnating material must be chosen, and, respectively, appropriate external conditions such as pressure or temperature must be created (cf. "Franz F. P. KOLLMANN, Wilfried A. COTÉ Jr., Principals of Wood Science and Technology, Springer-Verlag Berlin Heidelberg New York 1968" and DE 636 413; Verfahren zum Herstellen von verdichteten Holzwerkstoffen).

From U.S. Pat. No. 6,047,751 A, it is known to heat a wooden workpiece by ultrasound and to compress it afterwards, whereby the volume of the wooden workpiece is by and large reduced and the wood is dehydrated and compacted. In doing so, the cells of the wood are not destroyed.

The invention is based on the object of providing a method and a device for carrying out said method by means of which a compacted surface of a wooden workpiece is producible, whereby a particularly high compactness of the surface can be achieved without adding any foreign materials or chemical substances.

With a method of the initially described kind, this object is achieved in that the surface of the wooden workpiece—while preventing the entry of oxygen—is heated in at least partial areas by supplying energy to the surface, which energy supply produces a frictional relative motion on the wooden workpiece and hence a heating of said piece, and under pressure until a thermoplastic adhesive substance coming from the wooden workpiece is formed, whereupon the surface and a volume area beneath the surface are compacted under application of pressure while being cooled. Said method is characterized in that no foreign materials or chemical substances have to be added prior to, during or after the process, rather, only the wooden workpiece is modified selectively in order to obtain an abrasion and impact resistant surface, which is also much harder than the untreated wood, in the areas of a wooden workpiece or of several wooden workpieces, respectively, which are subject to the described method.

Connections of wooden workpieces can be roughly divided into two groups (cf also WO 00/97137; Integral Joining). The first group consists in that the transmission of forces between the wooden workpieces is accomplished by an element transmitting the forces, which is glued, for example, to the surfaces of the wooden workpieces to be connected. In practice, the material- or form-fitting connection thus produced is limited to the contact surfaces of wooden workpieces. The areas of the workpiece which are located outside of the contact surface have no influence on the mechanical properties of the connection.

The second group of connections is based on the fact that parts of the connective element project into the interior of the wooden workpieces and that the parts of the wooden workpieces which are located outside of the contact surface also have a significant influence on the mechanical properties of the connection which has been established. Connections belonging to this group generally have a higher load-bearing capacity.

Furthermore, the invention has as its object to provide a method and a device for carrying out said method by means of which a connection of two wooden workpieces according to the above-described second group is feasible, whereby an addition of foreign materials or chemical substances can be avoided.

Said object of the invention is achieved in that both the contact surface of a first wooden workpiece and the contact surface of a second wooden workpiece—while preventing the entry of oxygen—are heated in at least partial areas of the surfaces contacting each other by supplying energy to the contact surfaces, which energy supply produces a frictional relative motion between the wooden workpieces and hence a heating of the cell structure and, especially because of said heating and because of the frictional relative motion, a destruction thereof, and under pressure until a thermoplastic adhesive substance is formed, whereby the two wooden workpieces are pressed against each other with their contact surfaces under application of pressure, whereupon the contact surfaces of the two wooden workpieces and volume areas beneath said surfaces are cooled, a surface area of at least one of the wooden workpieces is compacted under pressure and the wooden workpieces are welded to one another, with the thermoplastic adhesive substance penetrating under the contact surface of the compacted wooden workpiece or wooden workpieces, respectively.

In contrast to methods corresponding to the current state of wood joining technology, according to the invention, the adhesive substance is obtained from the wooden workpieces to be connected by supplying energy selectively. In addition, the wooden workpieces are compacted in and around the region of the surface to be joined so that the strength of the connections thus produced is substantially increased by material properties of the parts in the joint area and of the partial areas located in the interior of the wooden workpieces. Thus, this is a "pressure welded joint" of the two wooden workpieces.

In order to achieve particularly good results, the wooden workpiece or the wooden workpieces, respectively, is/are preferably conditioned, during the supply of energy, to a predetermined maximum moisture content and/or to a predetermined minimum temperature and/or surface quality such as roughness, and, respectively, the wooden workpiece or the wooden workpieces can be conditioned, prior to the energy supply, to a predetermined maximum moisture content, to a predetermined minimum temperature and/or surface quality.

A preferred variant of the method is characterized in that the friction is caused by an oscillating relative motion between the surface of the wooden workpiece and the surface of a counter workpiece, in particular in the form of a linearly oscillating relative motion (moving direction roughly parallel to the surface) or in the form of an ultrasonic motion (moving direction at an arbitrary angle, preferably at a right angle to the surface of the wooden workpiece), with the relative motion advantageously being produced with the aid of ultrasound.

If a connection according to the invention is to be established between two wooden workpieces, a second wooden workpiece is used as the counter workpiece.

Furthermore, the invention described herein has as its object to produce a compacted surface of a wooden workpiece, in particular a surface which is particularly stable in terms of abrasion and impact resistance, wherein a counter workpiece having a higher melting and boiling temperature than the wooden workpiece and comprising a smooth surface with a small wetting angle which prevents adhesion, such as a metallic or mirrored surface, is used as the counter workpiece.

The natural material wood is characterized by its material properties varying within the workpiece, which similarly, as with conventional types of wood working, have different effects on the method and on the joining of wood produced accordingly. With respect to the application-specific objects presented above, another object of the method presented here is to adjust the compaction method discussed herein and the devices therefor to the varying material properties of the natural material wood. In contrast to methods corresponding to the current state of welding technology and/or wood joining technology, it is thus possible to accomplish the degree of the compaction according to the invention depending on properties of the wooden workpiece or wooden workpieces, respectively, especially depending on the density, in order to prevent the formation of discontinuities resulting from the varying material properties of wood in the areas subject to the method.

Suitably, the compaction can also be accomplished depending on a mechanical strength value of the wooden workpiece or wooden workpieces, respectively.

For large-surface wooden workpieces it has turned out to be advantageous if the method is first performed across a partial surface of a wooden workpiece and subsequently across further partial surfaces of the wooden workpiece, wherein, according to a particularly favourable time-saving variant, the method is performed across the surface of a wooden workpiece in a continuously progressive manner.

The compaction is suitably effected by a force which is roughly vertical to the longitudinal axis of the wood fibres of a wooden workpiece, preferably in a radial direction of the tree trunk.

It is, however, also possible to perform the compaction at an angle deviating from 0° relative to the longitudinal direction of the wood fibres of a wooden workpiece, in so far as the stress condition resulting from the applied force allows a compression of wood cells according to the above-indicated description, wherein, however, the direction of the resulting force exhibits a deviation smaller than 90° relative to the longitudinal direction of the wood fibres, particularly since an upsetting deformation occurs rather than a compaction if a force is applied in the longitudinal direction of the wood fibres.

For the purpose of stabilizing the surface-treated wooden workpiece and the interconnected wooden workpieces, respectively, a vaporization of the compacted surface and of the welded joint, respectively, of the wooden workpiece or wooden workpieces, respectively, is suitably carried out after the surface compaction or after welding, respectively, in order to stabilize the dimension of the compaction according to the invention.

The thermoplastic adhesive substance is preferably manufactured in an anaerobic atmosphere.

A device for carrying out the method according to the invention is characterized by:

- a workpiece receiver for at least one wooden workpiece,
- a first station comprising an energy-supply means which can be oriented toward a surface of the wooden workpiece,
- a second station comprising a compaction means which can be oriented toward a surface of the wooden workpiece, and
- a third station comprising a cooling means for the wooden workpiece.

Thereby, either a conveyor for transporting a wooden workpiece from one station to another or a conveyor for transporting the individual stations to a wooden workpiece can be provided.

The compaction means is suitably coupled to the cooling means.

Preferably, the energy-supply means and/or the compaction means and/or the cooling means can be brought into direct contact at the surface of the wooden workpiece.

For the pretreatment of a wooden workpiece, the workpiece receiver is advantageously provided with a conditioning means, such as a drying means and/or heating means, for the wooden workpiece.

According to a preferred variant, the device is characterized in that the energy-supply means is designed as a means acting upon a counter workpiece, which means produces a frictional relative motion between the counter workpiece and a wooden workpiece, with the frictional relative motion advantageously being oriented either parallel or vertical to the surface of a wooden workpiece, which surface is to be treated.

For the production of a particularly abrasion and impact resistant surface on a wooden workpiece, the device is characterized in that the counter workpiece has a smooth surface, such as a metallic or mirrored surface, by means of which it can be brought into direct contact with the surface of the wooden workpiece.

If a connection is to be established between two wooden workpieces, the counter workpiece is suitably also designed as a wooden workpiece and both wooden workpieces can be brought into direct contact with their contact surfaces to be connected.

In order to stabilize a compacted wooden workpiece, a further station comprising a vaporization means for vaporizing a compacted wooden workpiece is advantageously provided.

If the device is equipped with a testing device for nondestructive testing of a wooden workpiece, it is possible to intervene during and/or immediately after the compaction of a wooden workpiece as described herein, should there be a deviation from desired parameters, for example, in order to ensure efficient series production.

According to a preferred variant, the device is provided with an enclosure attached to a gas-supply line, preferably to a supply means for anaerobic gas, at least in the region of the energy-supply means and preferably also in the region of the compaction means.

According to another preferred embodiment, the device is characterized in that the conveyor comprises two conveyor belt facilities whose conveyor belts are arranged opposite each other in such a way that at least one wooden workpiece is insertable by the opposing strands of the conveyor belts, which are actuatable in one and the same direction and at one and the same speed, which wooden workpiece can be conveyed, via the opposing strands, to the energy-supply means and further to the compaction means and cooling means as well as to an optionally provided testing device and to an optionally provided vaporization means, wherein, suitably, one of the two conveyor belt facilities comprises two conveyor belts arranged one after the other in the machine direction and actuatable in the same direction, between which a supply means for a further wooden workpiece and/or an energy-supply means is/are provided.

Below, the invention is illustrated further on the basis of the description by way of several exemplary embodiments, with FIG. 1 showing a section through a wooden workpiece transversely to the fibre direction in the uncompacted condition, and FIG. 2 showing the same in the compacted condition according to the invention.

Figure 1:
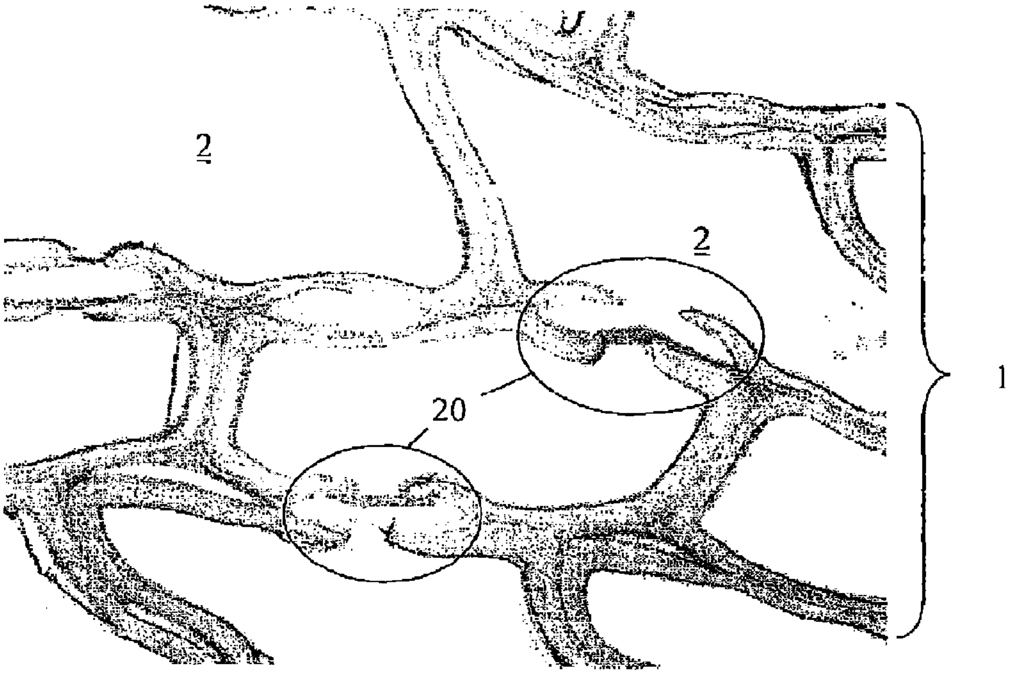
Figure 2:

By way of comparing FIG. 1 to FIG. 2, which show a wooden workpiece 1 cut transversely to the wood's fibre direction under a microscope on one and the same enlarged scale, it is possible to see how the cross-sections of the cells 2 are changed by compaction. According to FIG. 2, the cells 2 are compressed, and it is also visible that a thermoplastic adhesive substance 3, which is formed by the wooden workpiece 1 itself, has penetrated between the compressed cells 2. In the left-hand bottom corner of said figure, an accumulation of the thermoplastic adhesive substance 3 can be seen, as it forms, for example, during the manufacture of a welded connection according to the invention with a second wooden workpiece.

The overall quality of the compaction of the wood material can be inferred from the extent of the thickness shrinkage during partial processes III to IV, in which the thermoplastic adhesive substance is formed and the cells are compacted, respectively.

Figure 6:
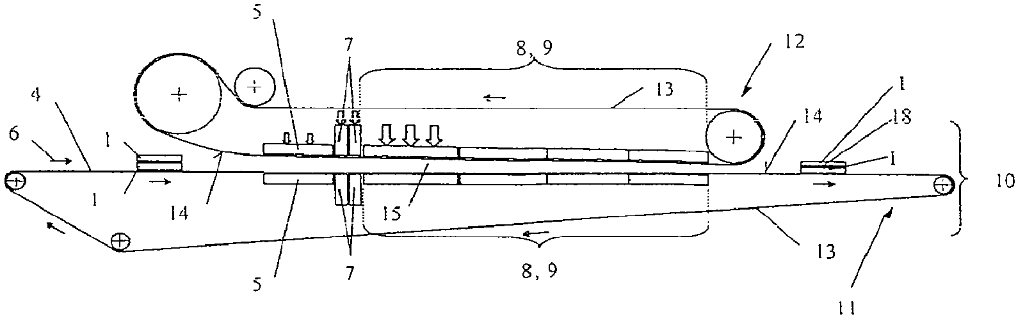
FIGS. 6 to 11 show schematic illustrations of devices for carrying out the method according to the invention.

The device illustrated in FIG. 6 serves for the production of a welded joint between two wooden workpieces 1, 1' placed on top of each other. The device comprises a workpiece receiver 4 for two wooden workpieces 1, 1' placed on top of each other, a station 5 for conditioning the two wooden workpieces 1, 1' lying on top of each other, and furthermore, in the conveying direction 6 of the wooden workpieces 1, 1', a station comprising an energy-supply means 7, followed by a station comprising a compaction means 8 which is coupled to a further station designed as a cooling means 9.

For transporting the wooden workpieces 1, 1', a conveyor 10 formed by two conveyor belt facilities 11, 12 is provided, whose conveyor belts 13 are arranged opposite each other in such a way that the two wooden workpieces 1, 1' rest against the opposing strands 14 of the conveyor belts 13. The individual stations as described above are located between the reciprocating strands of each conveyor belt 13.

For securing the wooden workpieces 1,1', a clamping device, a holding fixture using negative pressure and/or a surface of high roughness is/are to be provided optionally so that the energy supply to the contact surface 17 and the joint 18, respectively, is guaranteed in the form of oscillations at an arbitrary angle, preferably amounting to 0° or 90°.

For the purpose of compacting the adjacent surfaces of the two wooden workpieces 1, 1' arranged on top of each other, the gap 15 between the two strands 14 of the conveyor belts 13 is advantageously designed in a tapering fashion, i.e., the two strands 14 of the conveyor belts 13, which strands are running in the same direction and are facing each other, are not oriented precisely parallel to each other but are oriented against each other, with a wedge-shaped gap 15 being formed.

Figure 7:
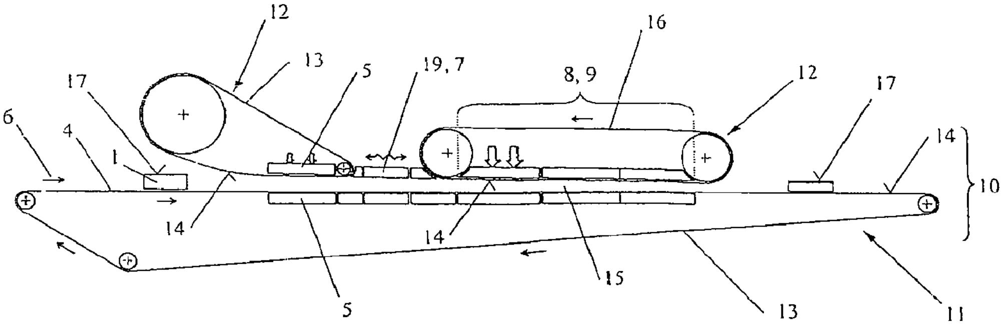

According to the device illustrated in FIG. 7, the upper one of the two conveyor belt facilities 12 is formed by two conveyor belts 13 and 16 consecutively arranged in the machine direction and actuatable in the same direction, between which the energy-supply means 7 is provided, which, in this case, can be brought into direct contact with the surface 17 of a wooden workpiece 1. This type of device serves for compacting the surface 17 of an individual wooden workpiece 1 in order to develop a particularly wear and impact resistant surface on said wooden workpiece 1.

Below, the operation of the devices according to FIGS. 6 and 7 is illustrated further:

The wooden workpieces 1 and 1', respectively, are heated by selectively supplying energy to the surfaces subject to the method and/or in areas of the wooden workpiece 1, 1', with mechanical pressure being applied and energy being introduced. When applying the method according to the invention using a device according to FIG. 6 for joining two wooden workpieces 1, 1' in a clean manner, energy is introduced between the wooden workpieces, for example by a relative motion, preferably in the form of a linear circular motion (moving direction parallel to the joint 18 of the wooden workpieces 1, 1'), or by ultrasonic vibration (moving direction at an arbitrary angle, preferably at a right angle to the joint 18 of the wooden workpieces 1, 1'). The relative motion of the wooden workpieces has to occur under a force which is oriented at a right angle to the joint so that a continuous contact between the wooden workpieces 1, 1' will be ensured.

When applying the method for compacting a surface of an individual wooden workpiece 1 using a device for surface finishing as illustrated in FIG. 7, a wooden workpiece 1 is moved relative to a nonporous, for example metallic, counter workpiece 19, which has a higher melting and boiling temperature than the melting temperature of the components of the wood material, which components have to be liquefied in order to form the thermoplastic adhesive substance 3. Moreover, the surface of the counter workpiece 19 has to exhibit a high wetting angle so that a non-positive connection is not able to emerge between the thermoplastic adhesive substance 3 formed in the subsequent process steps and the counter workpiece 19. For example, a metal of type 1.43012R, corresponding to DIN EN 10088, meets the demands that are made; this is a "Teflon-like steel".

The application of ultrasound technology turns out to be advantageous especially if several wooden workpieces 1, 1' are simultaneously joined integrally or if the surfaces 17 of wooden workpieces 1 are finished in a continuous process.

The introduction of the required energy, for example, by means of a linearly oscillating relative motion is also suitable for finishing surfaces 17, according to the invention, in a continuous process and likewise for joining two wooden workpieces 1, 1'.

Due to the relative motion between the wooden workpieces 1, 1' or between the wooden workpiece 1 and the counter workpiece 19, respectively, and due to the frictional forces thus activated, the wood material of a wooden workpiece 1 or 1', respectively, is gradually heated on its surface and in the joint 18, respectively.

The progressive heating of the surface of a wooden workpiece 1, 1' (at least) in the area of the contact surfaces between two wooden workpieces 1, 1' or between a wooden workpiece 1 and a counter workpiece 19, which contact surfaces move relative to each other, entails several effects. At low temperatures, the introduction of energy causes a processing and conditioning of the material. At least in the areas relevant for the subsequent (partial) processes, the material wood is conditioned such that the subsequent processes described below can proceed. As a result, the quality of the surface of the wooden workpiece 1, 1' (roughness, type of treatment etc.) as well as the physical state (temperature, moisture etc.) prior to the treatment have no effect on the subsequent compaction of the wooden workpiece 1, 1'. The method according to the invention does not rule out that such a processing and conditioning of the material could be afforded by the pretreatment in a conditioning means and/or by process-external measures.

If the wood material is heated further to temperatures of around 400° C., one or several components of the wood such as, e.g., lignin is/are liquefied, i.e. a thermoplastic adhesive substance 3 is formed. During the formation of said thermoplastic adhesive substance 3, the entry of oxygen has to be cut off in order to prevent burning or charring of the wood materials. The hermetical closure is ensured, on the one hand, by the mechanical pressure acting vertically on the contact surface (joint 18 and surface 17, respectively), and, on the other hand, by the abrasion of the wood material and the softening of the wood material caused by the energy supply. The heating of the wood material also leads to an opening of the membranes 20 connecting the wood cells 2 so that, under low pressure, the thermoplastic adhesive substance 3 can penetrate through the contact surface and can be pressed into the interior of the wood material (cf. FIG. 2).

Figure 8:
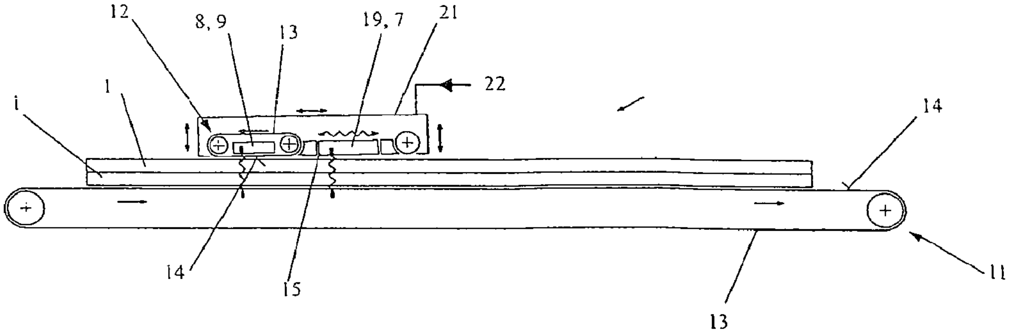

The above-described method according to the invention does not rule out that the formation of the thermoplastic adhesive substance 3 can also occur in an anaerobic atmosphere so as to prevent burning and/or charring of the wood material, for which purpose the device is provided with an enclosure 21 ending in a supply means for anaerobic gas 22 (cf. illustration in FIG. 8).

The thermoplastic adhesive substance 3 thus formed is largely made of lignin and/or chemical modifications thereof; the viscous adhesive properties of the thermoplastic adhesive substance 3 obtained in this way from the material wood are utilized for the compaction according to the invention of the porous material as described below. Due to the continuous destruction of the cell structure at the surface of the material to be compacted, lignin from volume areas which were located beneath the surface at the beginning of the process can also be used for the production of the thermoplastic adhesive substance.

After a sufficient amount of thermoplastic adhesive substance has formed and the wood material has been heated, a further input of energy is prevented; the wood material is compacted according to the invention.

For one thing, the softened cells 2 are compressed by plastic deformation under high pressure. Due to the wood structure and especially due to the sufficient softening of the cell structure caused by the progressive heating of the wood material, during the compaction by plastic compression, no deformation of the wooden workpiece 1 or 1', respectively, or merely a deformation which is inevitable because of the compression of cell cavities, occurs toward the areas softened by the introduction of energy 7, transversely to the direction of the applied force.

For another thing, the opening of the membranes 20, which has occurred beforehand, results in an impregnation of the cell cavities under low pressure, and, due to the adhesive properties of the thermoplastic adhesive substance 3, causes the cell walls to stick together. Both partial processes of compaction, i.e., compression as well as impregnation, strongly improve the mechanical properties of the compacted zone with regard to the two above-mentioned applications according to the invention: the finishing of surfaces and the production of a welded joint.

When the input of energy is stopped, a temperature balance occurs between the heated parts of the wooden workpieces 1, 1' and the environment, respectively, resulting in a curing of the thermoplastic adhesive substance 3. The cooling process can of course be accelerated by external measures.

In case the thermoplastic adhesive substance is formed between two wooden workpieces 1, 1', the wooden workpieces 1, 1' are joined integrally by making use of the adhesive properties and, at the same time, compacting the wooden workpieces 1, 1' in accordance with the invention at least on their surfaces, i.e., by impregnation using the thermoplastic substance and by compressing the cells.

If a nonporous material is used as a counter workpiece 19 for a wooden workpiece 1, integral joining between the workpieces 1 and 19 is prevented because of the small wetting angle. The cell structure on and near the surface 17 of the wooden workpiece 1 is compressed and impregnated by means of the thermoplastic adhesive substance 3. Due to the properties of the thermoplastic adhesive substance formed according to the above-described method, the cells 2 of the wooden workpiece 1 will, in addition, stick together.

Upon the plastic deformation of the cell structure and during the cooling of the wood material or of parts of the wood material, respectively, tensions inherent to the material can arise even with optimum machine parameters, which tensions might cause a redeformation of the compressed cells 2 if the compressed wood material is stored in water or stored in a similar way. The stabilization of the deformed cells 2 by means of water vapour, whereby the compacted wooden workpiece 1 or 1, 1', respectively, is clamped, constitutes an established method for relieving tensions caused by plastic deformation, which can also be applied for the present method.

The natural material wood is characterized by its properties varying within the workpiece 1, 1', which can be discerned with the naked eye, for example, on the basis of early and late annual rings. Similarly as with conventional types of wood working, the weakest parts of the wooden workpiece 1, 1' influence the use thereof, such as, for example, in a connection with other wooden workpieces. The quality control described in the following provides the possibility to check in a nondestructive manner the formation of the thermoplastic adhesive substance 3 and the compaction by impregnating the cells 2 using the adhesive substance 3 and by compressing the cells 2.

The thermoplastic adhesive substance 3 formed according to the invention and the compacted cell structure have a higher specific density as compared to untreated wood. The altered physical properties resulting therefrom of the modified areas of the wood allow conclusions, for example, about the degree of compaction and/or the amount of thermoplastic adhesive substance formed. Established methods of nondestructive quality inspection such as, e.g., ultrasound and computer tomography can be used for checking the quality of the compaction produced according to the invention during and/or after the process.

Figure 4:
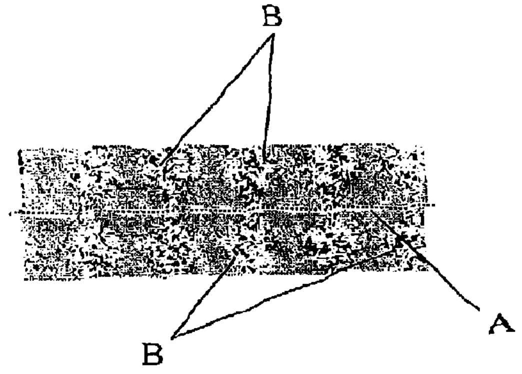
FIGS. 4 and 5 show computer tomography images of compacted surfaces of wooden workpieces.
Figure 5:
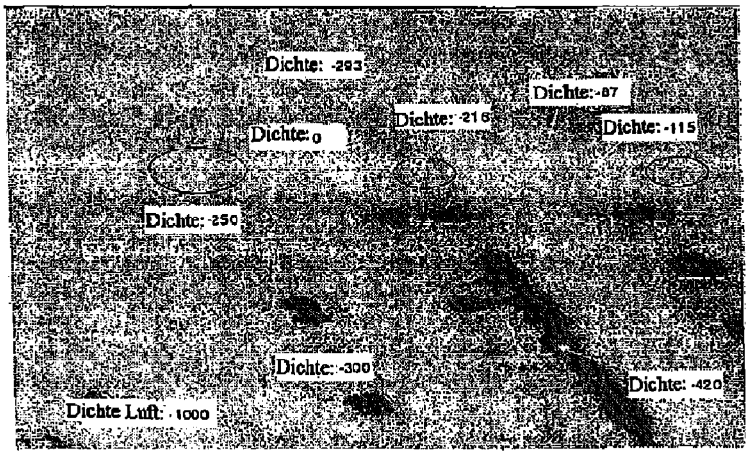

FIGS. 4 and 5 show computer tomography images of the compacted surfaces of two wooden workpieces 1, 1' that are welded to one another. For one thing, the compacted areas are clearly discernible on the surfaces of the wooden workpieces due to their light colour. FIG. 5 includes an illustration of the measuring points of the local density relative to the ambient air.

For another thing, so-called discontinuities are visible in the compacted zone. Said discontinuities occur if the process parameters are inadequately adjusted to the locally varying properties of the above-defined material wood.

Line A indicates the approximate course of the welded connection, i.e., of joint 18; line B indicates the position of annual rings (late wood).

With regard to the varying properties of the material wood, the miscellaneous effects thereof on the method according to the invention for a compaction free of foreign matters and/or on the final product, the above-described quality control is suitable not only for hodometry but also for controlling the method, in particular the parameters of the energy supply and those of the compaction of areas of the wooden workpiece 1, 1' which are subject to the method. Based, for example, on a time-travel diagram, the progression of the (partial) processes can be controlled and a conclusion can be drawn about the properties of the clean compaction that has occurred.

However, the measurement of physical properties which change locally during the process due to the modification according to the invention of the wooden workpiece 1, 1' and the drawing of respective conclusions about the progression of the modification according to the invention in areas of the wooden material subject to the method has to be regarded as the more precise control method. In contrast to existing methods of wood treatment, the process parameters of the method according to the invention are not applied globally to the entire wooden workpiece 1, 1' but are adjusted to the local properties of the same.

Local discontinuities in areas treated in accordance with the method according to the invention can thus be localized and corrected during and/or after the method. There is a direct correlation between the physical properties such as, for example, the mechanical strength or water resistance of the areas of wooden workpieces 1,1' which have been compacted as per the method according to the invention.

In order to produce a clean compaction with high mechanical properties such as, for example, high strength or water resistance as per the method according to the invention, it is advantageous to apply a quality control as described above for controlling the method.

The physical properties of the compacted wooden workpieces 1, 1' are clearly dependent on the amount of thermoplastic adhesive substance 3 formed and on the extent and dimensional stability of the compaction of the wood structure which has occurred.

Figure 3:
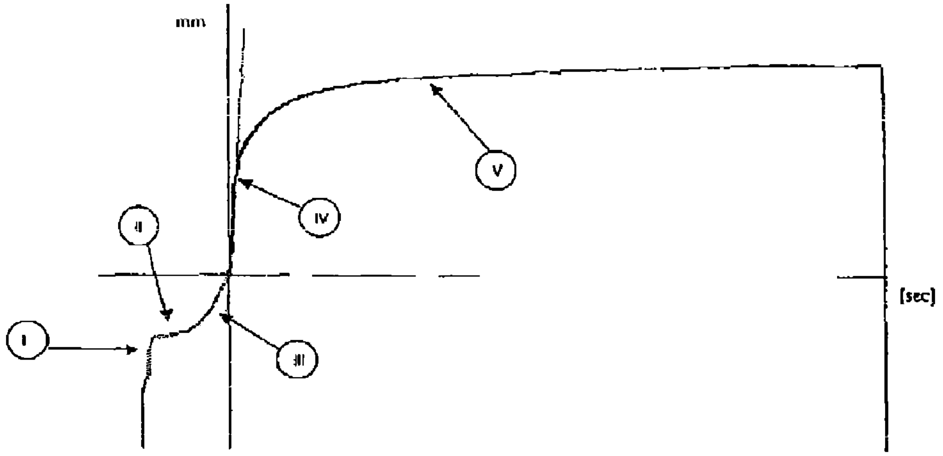
FIG. 3 illustrates the method according to the invention in chart form.

FIG. 3 shows the essential steps of the method according to the invention in chart form, wherein the change in the thickness of a wooden workpiece 1 is illustrated over time. The reduction in thickness is plotted on the ordinate; the abscissa serves as the time axis. The negative area of the time axis is characterized by the energy supply, the positive area is characterized by the prevention of any further energy supply. The division of the total process discussed below and, respectively, the approximation of the graph shown in FIG. 3 into partial processes is based on the subjective perception during the process and on the modification of the graph shown in FIG. 3. The transition between partial processes of the method according to the invention is normally fluent, with the partial processes hereinafter being indicated by I to V.

The reception I of one or several wooden workpieces is followed by the introduction, which first involves a conditioning II of the wooden workpieces 1 and then the formation III of the thermoplastic adhesive substance 3. The partial process II is characterized by a slow (in temporal terms) material shrinkage, and the final partial process III is characterized by a fast material shrinkage. Upon stopping the input of energy (intersecting point of the abscissa and the ordinate), a compaction IV is effected according to the above description. Subsequently, the compaction undergoes curing V—caused by cooling.

FIG. 8 illustrates a surface treatment of a wooden workpiece 1 with large dimensions, whereby the surface 17 thereof is compacted. The device serving for this purpose, including the stations thereof, is embedded in an enclosure 21 attached to a gas-supply means 22. Preferably, anaerobic gas is supplied.

Figure 9:
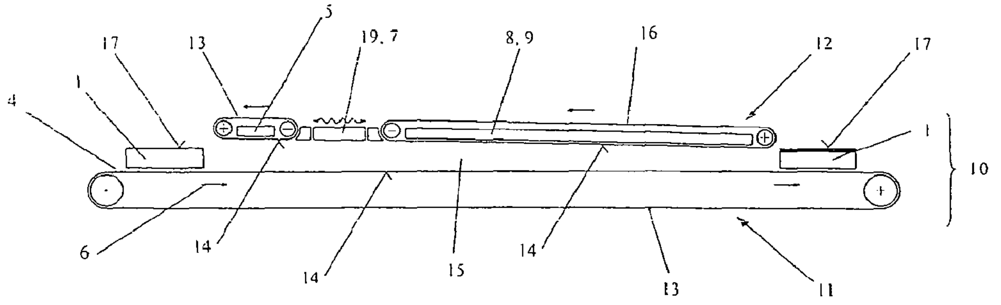

FIG. 9 shows a device without an enclosure by means of which relatively small wooden workpieces 1 can be treated successively according to the invention in a continuous operation, which means that they can be provided with a compacted surface 17.

Figure 10:
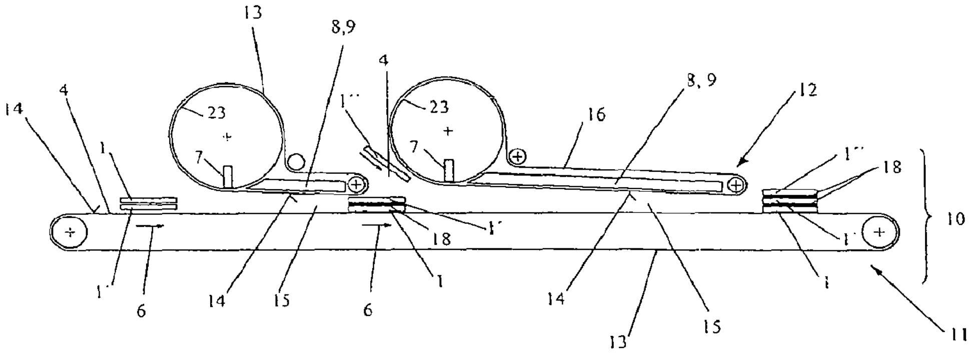
Figure 11:
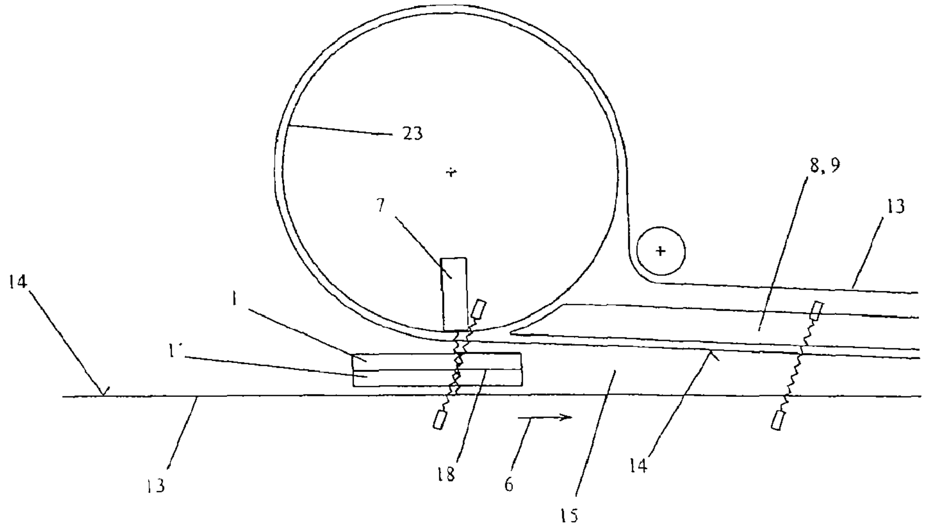

In FIG. 10, a variant is illustrated according to which three wooden workpieces 1, 1', 1" can be welded to one another, wherein a first conveyor belt 13 first welds two wooden workpieces 1,1' placed on top of each other, and subsequently a third wooden workpiece 1' is placed on top of the two wooden workpieces 1, 1', which have previously been welded, and is welded to the two wooden workpieces 1, 1' previously welded to one another, using another device whose conveyor is also a conveyor belt 16. In this case, the energy-supply means 7 is housed in a respective deflection pulley 23 for the conveyor belt 13 or 16, respectively, so that no direct contact between the energy-supply means 7 and the wooden workpiece 1, 1' will occur. The energy is thus transmitted via the conveyor belt 13 or 16, respectively, to the wooden workpieces 1, 1', 1".

The invention is not limited to the exemplary embodiments illustrated in the drawing but can be modified in various ways. In addition to welding wooden workpieces 1, 1', 1" which, in each case, have fibres lying roughly parallel to each other, it is also possible, for example, to weld a wooden workpiece with its front side to another wooden workpiece vertically to the fibre directions thereof such as, for example, for the production of a corner joint.

The invention claimed is:

1. A method for compacting a surface of a wooden workpiece, the method comprising:

providing a wooden workpiece from a group selected from at least one of a solid wooden workpiece, a workpiece manufactured from materials similar to wood, bamboo, reed, other wood-based materials, plywood, chipboards, wood-containing paper, and paper enriched with resins;

heating a surface of the wooden workpiece in at least partial areas—while preventing the entry of oxygen--by supplying energy to the surface, which energy supply produces a frictional relative motion on the wooden workpiece and hence a heating and a destruction of the cell structure thereof;

placing the wooden workpiece under pressure until a thermoplastic adhesive substance coming from the wooden workpiece is formed; and compacting the surface and a volume area beneath the surface under application of pressure while being cooled.

2. A method for connecting two wooden workpieces contacting each other, the method comprising:

providing a first and second wooden workpiece, each having a contact surface;

heating both the contact surface of a first wooden workpiece and the contact surface of a second wooden workpiece in at least partial areas of the surfaces contacting each other—while preventing the entry of oxygen—by supplying energy to the contact surfaces, which energy supply produces a frictional relative motion between the wooden workpieces and hence a heating and a destruction of the cell structure of at least one wooden workpiece;

placing the first and second wooden workpieces under pressure until a thermoplastic adhesive substance is formed, whereby the two wooden workpieces are pressed against each other with their contact surfaces under application of pressure;

cooling the contact surfaces of the two wooden workpieces and volume areas beneath said surfaces cooled;

compacting a surface area of at least one of the wooden workpieces under pressure; and welding the wooden workpieces to one another, with the thermoplastic adhesive substance penetrating under the contact surfaces of the wooden workpieces.

3. The method according to claim 1, further comprising a step of conditioning the wooden workpiece during the supply of energy, to at least one of a predetermined maximum moisture content, to a predetermined minimum temperature, and to a surface quality such as roughness.

4. The method according to claim 1, further comprising a step of conditioning the wooden workpiece prior to the energy supply, to at least one of a predetermined maximum moisture content, to a predetermined minimum temperature, and to a surface quality such as roughness.

5. The method according to claim 1, wherein the friction is caused by an oscillating relative motion between the surface of the wooden workpiece and the surface of a counter workpiece, in particular in the form of a linearly oscillating relative motion that moves in a direction roughly parallel to the surface or in the form of an ultrasonic motion that moves in a direction at an arbitrary angle, preferably at a right angle to the surface of the wooden workpiece, by a relative motion oscillating vertically to the surface of the wooden workpiece.

6. The method according to claim 5, wherein the relative motion is produced with the aid of ultrasound.

7. The method according to claim 5, wherein a second wooden workpiece is used as the counter workpiece.

8. The method according to claim 5, further comprising a step of using a counter workpiece having a smooth surface with a small wetting angle which prevents adhesion.

9. The method according to claim 1, wherein the degree of the compaction is accomplished depending on properties of the wooden workpiece.

10. The method according to claim 9, wherein the degree of the compaction is accomplished depending on the density of the wooden workpiece.

11. The method according to claim 9, wherein the compaction is accomplished depending on a mechanical strength value of the wooden workpiece.

12. The method according to claim 1, wherein the method is first performed across a partial surface of a wooden workpiece and subsequently across further partial surfaces of the wooden workpiece.

13. The method according to claim 12, wherein the method is performed across the surface of a wooden workpiece in a continuously progressive manner.

14. The method according to claim 12, wherein the density of the wooden workpiece is measured continually during the method and at least one of the compaction and the formation of the thermoplastic adhesive substance is effected depending on the measured values.

15. The method according to claim 14, wherein the compaction is effected by a force which is roughly vertical to the longitudinal axis of the wood fibers of a wooden workpiece.

16. The method according to claim 15, wherein the compaction is performed at an angle deviating from 0° relative to the longitudinal direction of the wood fibers of a wooden workpiece, which deviation is smaller than 90° relative to the longitudinal direction of the wood fibers.

17. The method according to claim 16, wherein, in order to stabilize the dimension of the compaction, a vaporization of the compacted surface of the wooden workpiece is carried out after the surface compaction.

18. The method according to claim 1, wherein the thermoplastic adhesive substance is manufactured in an anaerobic atmosphere.

19. The method according to claim 2, further comprising a step of conditioning the wooden workpieces during the supply of energy, to at least one of a predetermined maximum moisture content, to a predetermined minimum temperature, and to a surface quality such as roughness.

20. The method according to claim 2, further comprising a step of conditioning the wooden workpieces prior to the energy supply, to at least one of a predetermined maximum moisture content, to a predetermined minimum temperature, and to a surface quality such as roughness.

21. The method according to claim 2, wherein the friction is caused by an oscillating relative motion between the surface of the wooden workpiece and the surface of a counter workpiece, in particular in the form of a linearly oscillating relative motion that moves in a direction roughly parallel to the surface or in the form of an ultrasonic motion that moves in a direction at an arbitrary angle, preferably at a right angle to the surface of the wooden workpiece, by a relative motion oscillating vertically to the surface of the wooden workpiece.

22. The method according to claim 21, wherein the relative motion is produced with the aid of ultrasound.

23. The method according to claim 21, wherein a second wooden workpiece is used as the counter workpiece.

24. The method according to claim 21, further comprising a step of using a counter workpiece having a smooth surface with a small wetting angle which prevents adhesion.

25. The method according to claim 2, wherein the degree of the compaction is accomplished depending on properties of the wooden workpieces.

26. The method according to claim 25, wherein the degree of the compaction is accomplished depending on the density of the wooden workpieces.

27. The method according to claim 25, wherein the compaction is accomplished depending on a mechanical strength value of the wooden workpieces.

28. The method according to claim 2, wherein the method is first performed across a partial surface of a wooden workpiece and subsequently across further partial surfaces of the wooden workpiece.

29. The method according to claim 28, wherein the method is performed across the surface of a wooden workpiece in a continuously progressive manner.

30. The method according to claim 28, wherein the density of the wooden workpiece is measured continually during the method and at least one of the compaction and the formation of the thermoplastic adhesive substance is effected depending on the measured values.

31. The method according to claim 30, wherein the compaction is effected by a force which is roughly vertical to the longitudinal axis of the wood fibers of a wooden workpiece.

32. The method according to claim 31, wherein the compaction is performed at an angle deviating from 0° relative to the longitudinal direction of the wood fibers of a wooden workpiece, which deviation is smaller than 90° relative to the longitudinal direction of the wood fibers.

33. The method according to claim 32, wherein, in order to stabilize the dimension of the compaction, a vaporization of the welded joint of the wooden workpieces is carried out after the welding.

34. The method according to claim 2, wherein the thermoplastic adhesive substance is manufactured in an anaerobic atmosphere.

35. The method according to claim 8, wherein the smooth surface with a small wetting angle is at least one of a metallic and mirrored surface.

36. The method according to claim 24, wherein the smooth surface with a small wetting angle is at least one of a metallic and mirrored surface.

37. The method according to claim 14, wherein the compaction is effected by a force which is in a radial direction of a tree trunk.

38. The method according to claim 30, wherein the compaction is effected by a force which is in a radial direction of a tree trunk.

* * * * *